United States Patent [19]

Weaver

[11] Patent Number: 5,173,268

[45] Date of Patent: Dec. 22, 1992

[54] OZONE GENERATION APPARATUS

[76] Inventor: William C. Weaver, 1714 Woodvalley Dr., Carmel, Ind. 46032

[21] Appl. No.: 874,014

[22] Filed: Apr. 27, 1992

Related U.S. Application Data

[63] Continuation-in-part of Ser. No. 721,988, Jun. 27, 1991, Pat. No. 5,160,481.

[51] Int. Cl.$^5$ ............................................. B01J 19/08
[52] U.S. Cl. .......................... 422/186.15; 422/186.07; 422/5; 422/121
[58] Field of Search .............. 422/3, 4, 5, 121, 186.07, 422/186.1, 186.14, 186.15

[56] References Cited

U.S. PATENT DOCUMENTS

| | | | |
|---|---|---|---|
| 743,432 | 11/1903 | Blackmarr et al. | 422/186.07 |
| 1,714,562 | 5/1929 | Keiser | 422/4 |
| 1,932,379 | 10/1933 | Ballentine | 422/4 |
| 2,303,331 | 12/1942 | Dauphine | 422/4 |
| 2,343,338 | 3/1944 | Steel | 422/186.07 |
| 2,638,644 | 5/1953 | Rauhut | 422/4 |
| 2,842,491 | 7/1958 | Toader | 422/186.07 |
| 3,457,160 | 7/1969 | Fortier | 422/186.07 |
| 3,925,673 | 12/1975 | Wright, Jr. | 250/432 |
| 4,049,400 | 9/1977 | Bennett et al. | 55/139 |
| 4,343,765 | 8/1982 | Elston et al. | 422/3 |
| 4,909,996 | 3/1990 | Uys | 422/186.07 |

*Primary Examiner*—Donald P. Walsh
*Assistant Examiner*—Daniel L. Jenkins
*Attorney, Agent, or Firm*—Locke Reynolds

[57] ABSTRACT

Ozone generating apparatus designed for installation into airflow ducts or other air handling structures of housing units or other buildings includes a porous gridwork, mesh, or other minimal airflow obstruction support with an ozone generating plate positioned to release ozone into passing air. A second housing attached adjacent to the first housing contains electrical circuits for developing an electrical potential applied across the ozone generating plates positioned in the first housing. The second housing has a control surface that includes a control mechanism for controlling the electrical circuits. The second housing also accommodates a first switch for activating and deactivating the electrical circuits that generate an electrical potential across the ozone generating plates. A rocker sail, positioned adjacent to the first switch and pivotally attached to one of the first and second housings for pivotal movement, causes activation or deactivation of the first switch in response to airflow through the first housing. Air striking the rocker sail pivotally moves the sail, activating the first switch, and consequently generating ozone. In the absence of airflow, the rocker saidl is biased to return to a position that deactivates the first switch. Accordingly, when airflow ceases the rocker sail moves to a position that deactivates the first switch, causing the generation of ozone to cease.

6 Claims, 3 Drawing Sheets

OZONE GENERATION APPARATUS

BACKGROUND OF THE INVENTION

This is a continuation-in-part application of Weaver, U.S. patent application Ser. No. 07/721,988, filed Jun. 27, 1991, now U.S. Pat. No. 5,160,481.

The present invention relates to ozone generators, particularly of the type intended to reduce offensive odors in air recirculated within a building or other enclosed structure. More particularly, this invention relates to mechanisms for controlling operation of ozone generators installed in air ducts of central heating and cooling systems.

For a significant fraction of the year, for most enclosed structures such as houses, office buildings, and the like, it is necessary to either heat or cool the air to provide a comfortable living temperature. Particularly in modern office buildings, where windows cannot be opened, the only supply of fresh air is through a central air handling system. This central handling air system typically includes appropriate mechanisms recirculating a portion of the building air, while at the same time expelling another portion of the building air. Fresh make-up air from outside the building is ordinarily introduced to ensure a sufficient air supply. In the absence of any make-up air, the recirculated air quickly becomes stale and can accumulate offensive odors. However, since energy is required to heat or cool newly introduced make-up air to the desired building temperature, limiting make-up air introduction increases energy efficiency of the building.

Many attempts have been made to remove offensive odors and to otherwise make the recirculated air within a building more acceptable. Liquids, sprays, and sublimating solids have been employed to introduce odor masking agents into the air. Filters have also been employed including chemically active agents such as activated carbon, potassium permanganate impregnated alumina, and the like.

Particular success has been achieved in eliminating offensive odors from enclosed spaces through the use of ozone generators which act to oxidize the unpleasant odors in the air while providing the air with a generally fresh spring-like scent. In general, the ozone generators have taken two forms. In a first form, ozone generation elements have been included in the original construction of certain air handling systems. An example of such a system is found in U.S. Pat. No. 4,343,765. A second type of unit comprises a portable unit easily transportable from room-to-room such as that sold by Ozonator Corporation of Athens, Ontario, Canada.

A need remains for ozone generating units easily adapted to existing structures for quick installation into existing air handling systems. There also remains a need for unobstrusive ozone generating units for use in individual rooms of office buildings and the like.

SUMMARY OF THE INVENTION

Ozone generating apparatus in accordance with the present invention are designed for simple and quick installation into existing airflow ducts or other air handling structures of housing units or other buildings. The ozone generation apparatus includes a first housing positionable in air handling conduits of central air handling systems for buildings. The first housing is configured to allow airflow therethrough, and is typically constructed with porous gridwork, mesh, or other minimal airflow obstruction support. An ozone generating plate is positioned in the first housing to release ozone into air passing through the first housing. A second housing is attached adjacent to the first housing. The second housing contains electrical circuits for developing an electrical potential applied across the ozone generating plates positioned in the first housing. The second housing has a control surface that includes a control mechanism for controlling the electrical circuits, and a back surface situated contiguous to outside surfaces of air handling conduits of a central air handling system. The back surface can include perimeteral flanges for securing the second housing to air handling conduits, or alternatively, can include spring clips, fasteners or other securement mechanisms.

The second housing also accommodates a first switch for activating and deactivating the electrical circuits that generate an electrical potential across the ozone generating plates. A rocker sail, positioned adjacent to the first switch and pivotally attached to one of the first and second housings for pivotal movement, causes activation or deactivation of the first switch in response to airflow through the first housing. Air striking the rocker sail pivotally moves the sail, activating the first switch, and consequently generating ozone. In the absence of airflow, the rocker sail is biased to return to a position that deactivates the first switch. Accordingly, when airflow ceases the rocker sail moves to a position that deactivates the first switch, causing the generation of ozone to cease.

The various features and advantages of the present invention will become apparent skilled in the art upon consideration of the following description of preferred embodiments exemplifying the best mode of carrying out the invention as presently perceived. The detailed description particularly refers to the accompanying drawings.

DETAILED DESCRIPTION OF THE DRAWINGS

Figure 1:
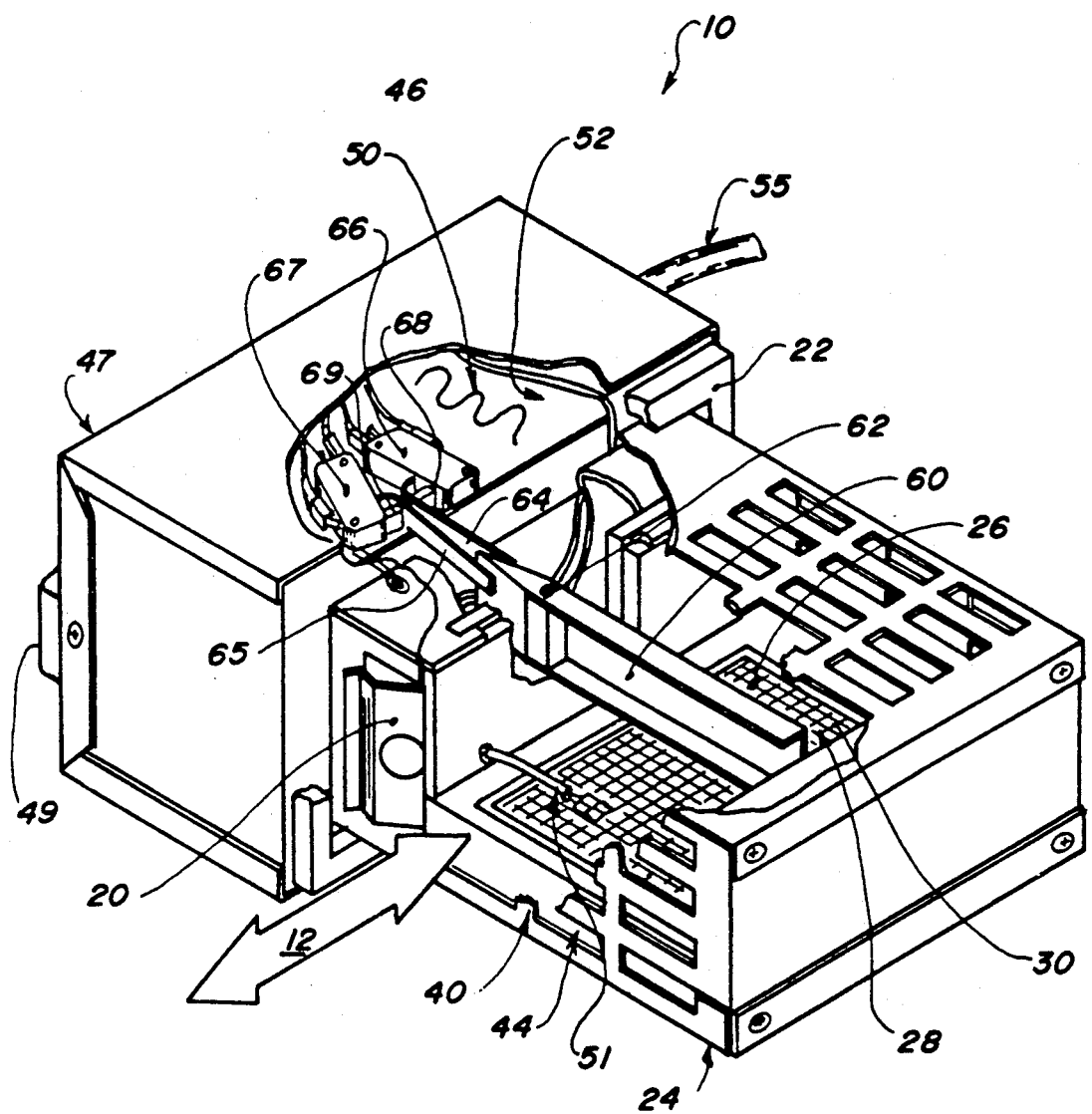
FIG. 1 is a perspective view of an embodiment in accordance with the present invention. Gridwork of the first housing is partially broken away to better illustrate a rocker sail positioned above an ozone generating plate. A second housing, attached to the first housing is also partially broken away to illustrate positioning of first and second switches adjacent to spring arms attached to the rocker sail for movement to activate or deactivate the first and second switches in response to commencement or cessation of airflow through the first housing.
Figure 2:
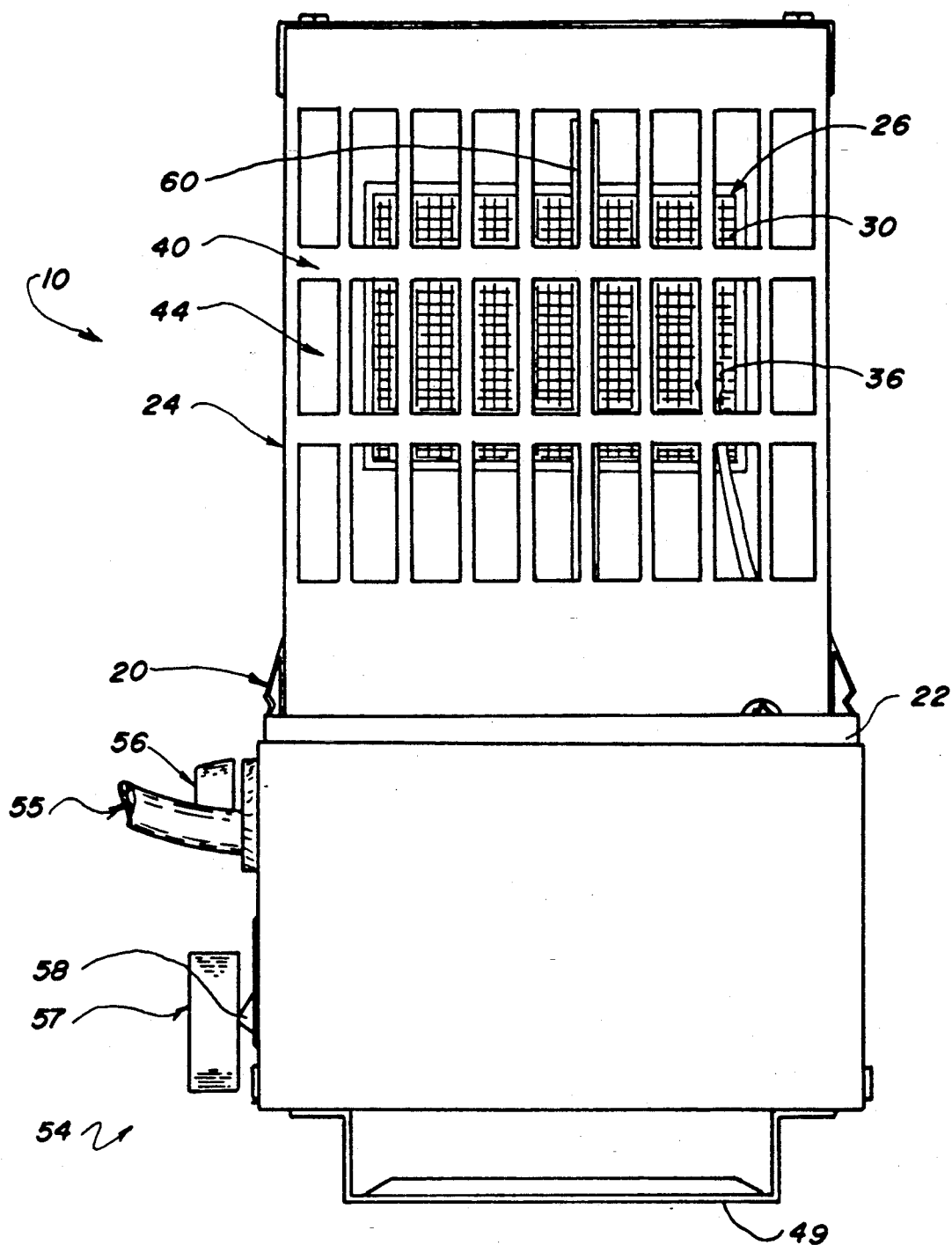
FIG. 2 is a top plan view illustrating positioning of manipulative controls on a control surface of the second housing.
Figure 3:
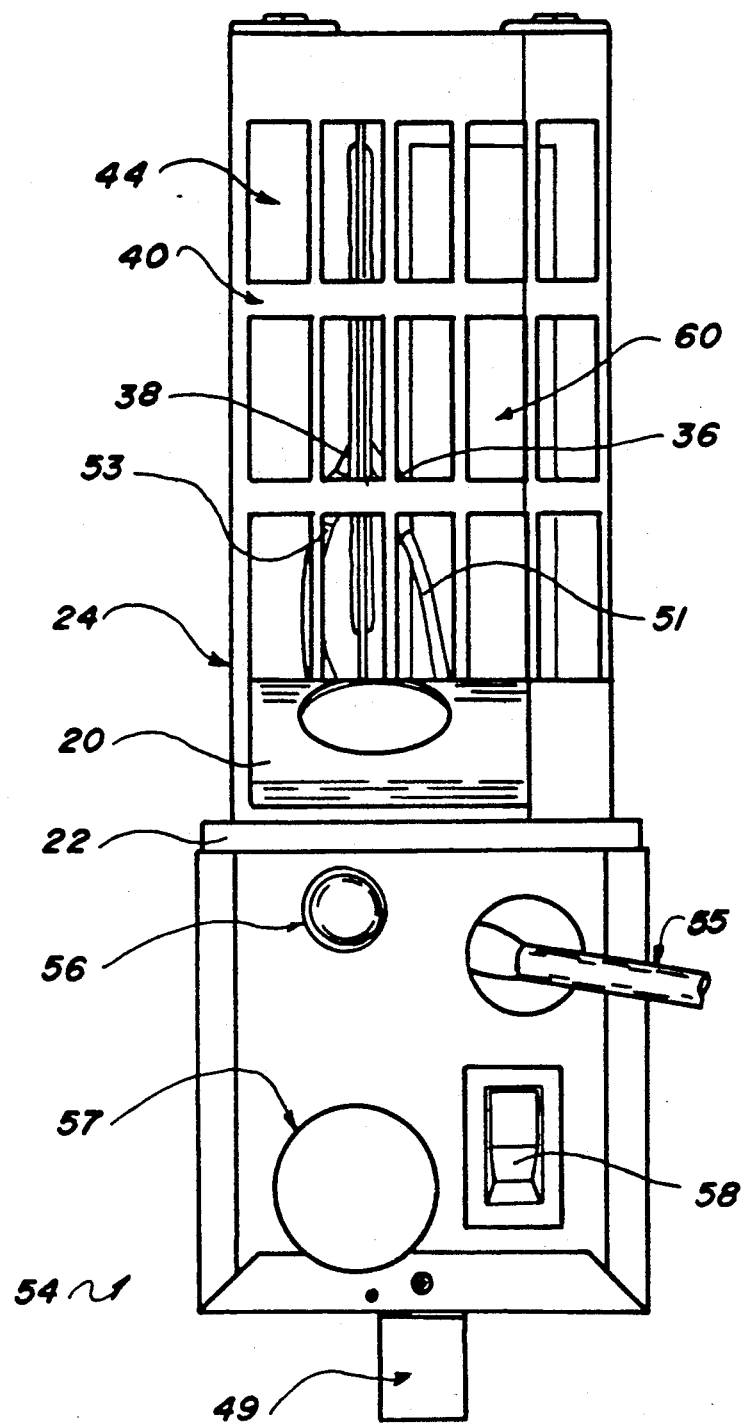
FIG. 3 is a side view illustrating the positioning of ozone generating plates in the first housing.

An ozone generating apparatus 10 for the production and distribution of ozone in air handling systems is illustrated in FIG. 1. The ozone generating apparatus 10 includes a first housing 24 removably connected to a second housing 46. The first housing 24 has porous walls 40 that permit airflow 12 from air handling systems to pass therethrough, carrying ozone produced within the first housing 24 into the airstream. The first housing 24 is configured for ready insertion into ductwork, tubes, or other air passageways in central air handling systems (not shown). Typically the first housing 24 is inserted through an opening (not shown) cut into ductwork of the air handling system. In preferred embodiments a reinforcing plate (not shown) having a generally rectangular configuration is permanently attached to the ductwork. The first housing 24 is inserted through the rectangular opening into the ductwork and attached by spring clips 20 to the second housing 46. The second housing 46 remains outside the ductwork to permit access to controls mounted on the second housing. A gasket 22 can optionally be mounted on either the first or second housings to seal and prevent air outflow from the ductwork adjacent to the first and second housings. remains outside the air passageway.

In preferred embodiments, the first and second housings can be formed from a plurality of metal sheets, with some metal sheets being folded at the edges to permit construction of generally rectangular units. Fasteners such as adhesives, screws, or bolts can be used to attach the unit together. The resulting structure can be manufactured at low cost, is durable, and can easily be manufactured in a range of sizes. Of course, as those skilled in the art will appreciate, other housing designs are feasible, including construction of unitary housings from engineering grade plastics, or other convention housing designs.

The first housing 24 of the ozone generating apparatus 10 has ozone generating plates 26 positioned therein in parallel, spaced apart relationship to each other. The ozone generating plates 26 include a non-conductive ceramic substrate 28, typically having a rectilinear configuration. An electrically conductive, metallic ozone emitter grid 30 is bonded to opposite sides of the ceramic substrate 28 to provide a wide area emitter of ozone when a sufficiently high electrical potential is applied across the metallic ozone emitter grid 30. The ozone generating plates 26 are supported within the housing 24 by a pair of ozone resistant polyvinyl chloride (PVC) elements 32. The PVC elements 32 include a plurality of slots 34 molded or machined to receive the edges of ceramic substrate 28. Electrical contacts 36 and 38 are also provided to contact the metallic grids 30 on opposite surfaces of the ceramic substrate 28.

In addition to holding and maintaining the first housing in a desired position in ductwork, the second housing 46 contains electrical circuitry 50. The electrical circuitry is typically powered by connection (via power cord 55) to household electrical current. The electrical circuitry 50 is assembled using conventional elements known to those skilled in the art, and allows development and control of high voltage potential necessary for application across the metallic ozone emitter grid 30 of the ozone generating plates 26 to create ozone. The electrical circuitry 50 includes an electrical transformer to increase household voltage to a voltage potential required for ozone generation.

The electrical circuitry 50 also includes control mechanisms 52 such as switches, rheostats and the like for controlling the level of voltage potential delivered across the plates. Appropriate manipulative controls 54 project outward through the second housing 46 to allow manual adjustment of the control mechanisms 52. For example, ozone level control 57 can be rotated to change the voltage potential delivered by electrical circuitry 50 to the ozone generating plates 26, effectively controlling the amount of ozone produced. In addition, power switch 58 allows an operator to manually turn the ozone generating unit on or off. An overload fuse 56 positioned adjacent to these manipulative controls 54 helps protect the electrical circuitry 50 from electrical overload, while facilitating ready replacement of the fuse 56 as needed.

In addition to manual control of ozone production, the ozone generating apparatus 10 includes an automatic control trigger mechanism 70 for automatically turning the apparatus 10 on in response to flow of air through the first housing 24, and for turning the apparatus 10 off in response to cessation of flow through the first housing 24. The mechanism 70 activates and deactivates first and second micro-switches 66 and 67 that are electrically connected to the electrical circuitry 50 to control application of power to the ozone generating plates 26.

The first and second switches 66 and 67 include first and second pressure sensitive buttons 68 and 69 that are respectively activated by depression and deactivated by release by first and second spring arms 64 and 65. The spring arms 64 are opposedly biased, and securely attached to a rocker sail 60 that extends adjacent to the ozone generating plates 26. The rocker sail 60 is pivotally mounted to the first housing 24 by a pivot pin 62. The rocker sail is configured to present a large "sail" surface that is readily moved in response to air flow in air handling conduits. The spring arms 64 and 65, attached to the rocker sail 60 on the opposite side of the pivot pin from the large sail surface, are biased contact the first and second switches and resist movement of the rocker sail about the pivot pin 60. The ozone generating apparatus 10 will begin production of ozone only when a predetermined minimum air flow intensity in the air handling conduits is sufficient to overcome the spring arm bias and press the spring arms to activate one of the first and second buttons 68 and 69. When air flow diminishes below the predetermined level, or entirely ceases, one of the spring arms 64 or 65 rotates the rocker sail and causes release of the first button 68 or second buttons 69 of the first or second switches 66 or 67.

The apparatus 10 provides a convenient, easily installed, and automatically controlled source of ozone to clean and purify air passing through air handling systems. The provision of dual switches 66 and 67 to alternatively activate the apparatus 10 in response to air flow through the first housing 24 allows for dual orientation installation of the apparatus 10 (i.e. "up" or "down" as desired) and minimizes inefficient electrical power usage except when air flow is occurring.

Although the invention has been described in detail with reference to the illustrated preferred embodiment, variations and modifications exist within the scope and spirit of the invention as described and as defined in the following claims.

What is claimed is:

1. An ozone generation apparatus adapted for installation into central air handling systems for buildings, the apparatus comprising:
   a first housing positionable in air handling conduits of central air handling systems for buildings, the first housing being configured to allow air flow therethrough,
   an ozone generating plate means positioned in the first housing to release ozone into air flowing through the first housing,
   a second housing attached adjacent to the first housing, the second housing containing electrical circuitry for developing an electrical potential for application across the ozone generating plates, the second housing having means for supporting the electrical circuitry and a back surface adapted to be situated contiguous to an outside surface of air handling conduits of a central air handling system for buildings, the back surface including a perimeteral flange for air tight securement to the air handling conduit, a first switch for activating and deactivating said electrical circuit, and a rocker sail positioned adjacent to the first switch and pivotally attached to one of the first and second housing for pivotal movement of the rocker sail in response to air flow through the first housing, with movement of a rocker sail in response to air flow activating the first switch, and movement of the rocker sail in response to cessation of airflow deactivating the first switch.

2. The apparatus of claim 1 wherein the ozone generating plate means further comprises:

a rectilinear ceramic substrate supported in the first housing, and a metallic ozone emitter grid bonded to a side of the ceramic substrate in contact with electrical circuitry.

3. The apparatus of claim 1 wherein the ozone generation apparatus further comprises:

a second switch positioned adjacent to the first switch for activating and deactivating said electrical circuit, with movement of the rocker sail in response to air flow activating the second switch, and movement of the rocker sail in response to cessation of airflow deactivating the second switch.

4. The apparatus of claim 3 further comprising first and second spring arms attached to the rocker sails, the first and second spring arms being positioned to respectively activate and deactivate said first and second switches, with the first and second spring arms opposedly biased to bring the rocker sail into a position that deactivates both the first and second switches upon cessation of air flow through the first housing.

5. The apparatus of claim 2, wherein the rocker sail is positioned to extend adjacent to the ozone emitter grid.

6. The apparatus of claim 1 further comprising spring clip means situated adjacent the first housing for coupling the apparatus to said air handling system.

* * * * *